United States Patent [19]

Weddigen

[11] 4,237,200
[45] Dec. 2, 1980

[54] ELECTROCHEMICAL STORAGE CELL

[75] Inventor: Gert Weddigen, Heidelberg, Fed. Rep. of Germany

[73] Assignee: Brown, Boveri & Cie AG, Mannheim-Käfertal, Fed. Rep. of Germany

[21] Appl. No.: 966,276

[22] Filed: Dec. 4, 1978

[30] Foreign Application Priority Data

Dec. 7, 1977 [DE] Fed. Rep. of Germany ....... 2754454

[51] Int. Cl.³ .......................................... H01M 10/39
[52] U.S. Cl. ................................... 429/102; 429/104; 429/191
[58] Field of Search ............... 429/104, 191, 193, 101, 429/102, 218

[56] References Cited

U.S. PATENT DOCUMENTS

| | | | |
|---|---|---|---|
| 3,749,603 | 7/1973 | Stringham et al. ................. | 429/104 |
| 3,811,943 | 5/1974 | Minck et al. .......................... | 429/104 |
| 3,841,912 | 10/1974 | Kagawa et al. ...................... | 429/104 |
| 4,118,545 | 10/1978 | Jones et al. .......................... | 429/104 |
| 4,146,684 | 3/1979 | Fischer et al. ....................... | 429/104 |

Primary Examiner—Anthony Skapars
Attorney, Agent, or Firm—Herbert L. Lerner

[57] ABSTRACT

Electrochemical storage cell of the alkali metal-and-chalcogen type with at least two spaces (anode and cathode space) separated by an alkali-ion-conducting solid electrolyte for receiving the reactants. The cathode space contains as catholyte at least one chalcogen or chalcogenide in dissolved or melted form, preferably sulfur or sulfides, as well as carbon- or graphite felt as the electrode material. The felt is provided with a layer that is porous, i.e., the surface of its fibers expose, in island-fashion, an alkali-ion-conducting substance which permits improved rechargeability at lower temperatures.

9 Claims, 2 Drawing Figures

ELECTROCHEMICAL STORAGE CELL

BACKGROUND OF THE INVENTION

1. Field of the Invention

This invention relates to an electrochemical storage cell of the alkali metal-and-chalcogen type with at least two spaces (anode and cathode space) separated from each other by an alkali-ion-conducting solid electrolyte for receiving the reactants, with the cathode space containing as catholyte at least one chalcogen or chalcogenide in dissolved or melted form, preferably sulfur or sulfides, as well as carbon- or graphite felt as the electrode material.

2. Description of the Prior Art

German Published Non-Prosecuted Application No. 2 633 345 describes such a storage cell. The essential purpose of the felt in the German storage cell is to increase the boundary surface, required for the electrochemical reaction, between the sulfur or the alkali sulfide produced during the discharge in the cathode space, and the current collector on the cathode side. The felt can be considered as the extension collector. Also, the spacing between the solid electrolyte and the cathodic current collector extended in this manner becomes very much smaller, whereby the resistance of the catholyte, which is very high particularly in the case of the fully charged state (sulfur phase), contributes substantially less to the internal resistance of the cell. Through this measure, satisfactory discharging of the cell is possible also if initially the pure sulfur phase is present in the cathode space. During the discharge, which is normally carried only to $Na_2S_3$, the conductive sodium polysulfides then appear in the cathode space to an increasing degree.

If the cell is recharged, elemental sulfur is instantaneously formed on the surface of the electrode, i.e., of the carbon- or graphite felt in this case, especially in the vicinity of the solid electrolyte. Since sulfur does not conduct, it blocks to some extent the continuation of the recharging process. This becomes the more critical, the more the sodium content in the cathode space drops and the sulfur content increases. As long as the composition of the melt is between $Na_2S_3$ and $Na_2S_5$, one still has the single-phase region with good mass exchange and the elemental sulfur formed will react rapidly with the polysulfide melt and form a polysulfide containing more sulfur, i.e., $Na_2S_3$ will become $Na_2S_5$, taking on two sulfur atoms. If the charging cycle is continued, then the cathodic reactant becomes two-phase, the one phase consisting of elemental sulfur and the other of $Na_2S_5$, which is saturated with sulfur.

Additional difficulties arising in this region have been recognized and attempts have been made to meet them, particularly by modifying the carbon- or graphite felt.

German Published Non-Prosecuted Application No. 2 633 345, attempted to overcome the difficulties by different porosity and different electric conductivity of the felt of graphite or carbon.

According to German Published Non-Prosecuted Application No. 2 622 404, a porous graphite felt is coated with material of polar or ionic character or with unfilled d-orbitals. For this purpose, metal oxides and sulfides, especially alpha-aluminum oxide, molybdenum disulfide, chromium trioxide, lanthanum chromite and tin oxide are proposed.

The compounds mentioned are to cause faster desorption of the sulfur produced during the recharging by spoiling the wetting of the sulfur on the graphite surface. In this manner, favorable effects in the direction of faster charging can be obtained at operating temperatures from 350° C. on, where the sulfur vapor pressure is several hundred Torr. This is not the case if the cell is operated at lower temperatures, as is desired nowadays for several reasons (among others, less corrosion, cost advantages).

SUMMARY OF THE INVENTION

It is an object of the present invention to provide an electrochemical storage cell with improved rechargeability by means which are effective at lower temperatures (e.g., 310° C.), where the sulfur vapor pressures are rather low (about 30 Torr).

With the foregoing and other objects in view there is provided in accordance with the invention, an electrochemical storage cell with at least one anode chamber containing alkali metal as the anolyte and at least one cathode chamber containing as catholyte at least one chalcogen in dissolved or melted form, as well as carbon- or graphite felt, with the anode chamber and the cathode chamber separated from each other by an alkali-ion-conducting solid electrolyte, the improvement which comprises incorporating in the felt a layer of porous felt in which the fibers of the layer of felt has exposed on its surface in island-fashion, an alkali-ion-conducting substance.

In a preferred embodiment, the islands have a diameter of about $5\mu$ to $100\mu$. The alkali-conducting substance contains at at least one member selected from the group consisting of beta-aluminum oxide, boron silicate glass and sodium-zirconium-phosphorus silicate having the formula $Na_{1-x}Zr_2P_{3-x}Si_xO_{12}$ wherein x is less than 1 to and including 0.

An advantageous feature of the invention is to interpose a glass layer between the alkali-ion-conducting substance and the fiber of the felt. Preferably, the substance consists of beta-aluminum oxide and the intermediate layer is a glass with the following composition $SiO_2$-79.7 parts by weight, $B_2O_3$-10.3 parts by weight $Al_2O_3$-3.1 parts by weight, $Na_2O$-5.2 parts by weight, CaO-0.8 parts by weight, MgO-0.9 parts by weight.

In an embodiment of the invention, zones with coated and uncoated felt bodies alternate in the cathode space perpendicularly or parallel to said solid electrolyte.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in conjunction with the accompanying drawings, in which.

DETAILED DESCRIPTION OF THE INVENTION

Figure 1:
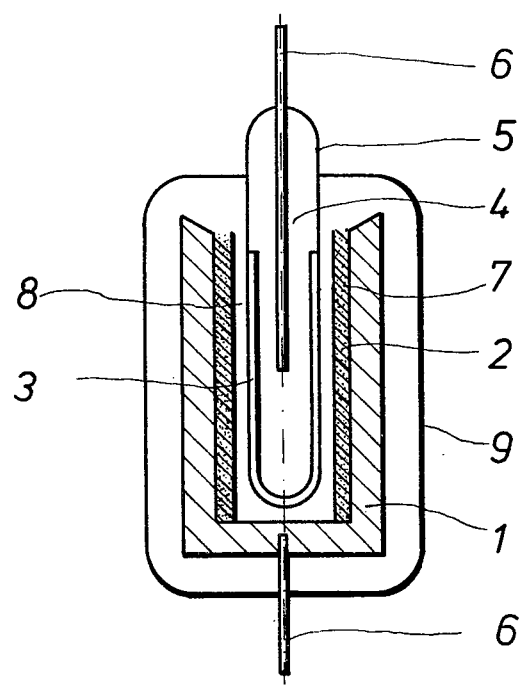
FIG. 1 is a cross section through a cup-shaped test cell.
Figure 2:
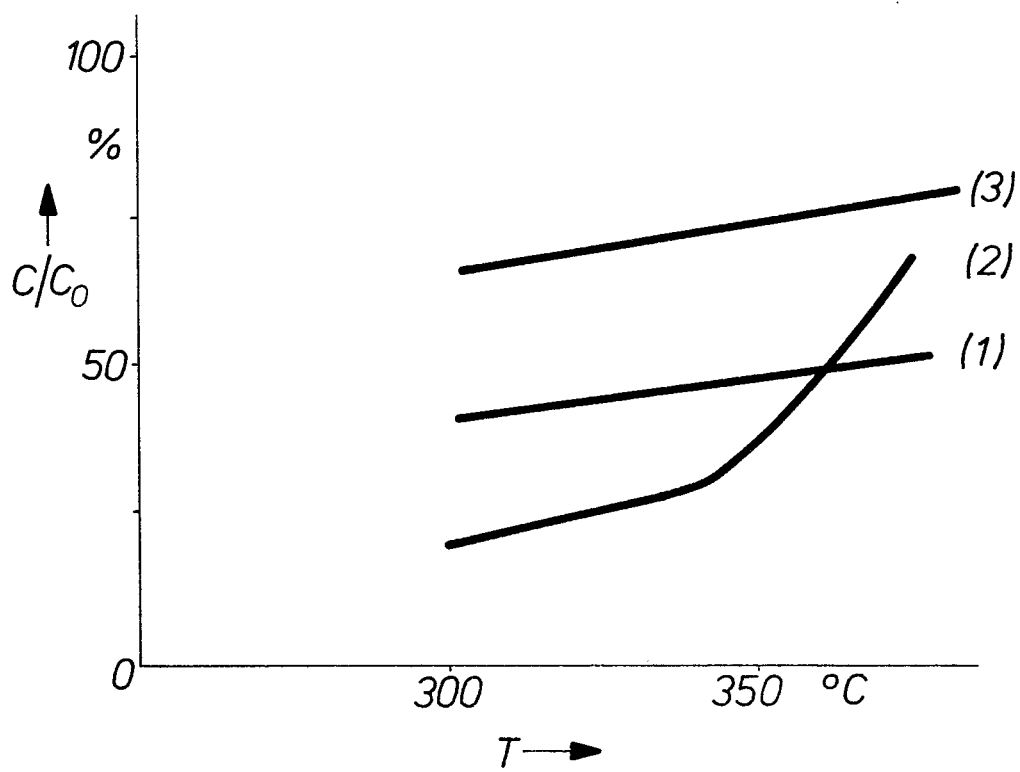
FIG. 2 shows curves in which the relative charging capacity C/Co was plotted against the temperature of the cell.

In accordance with the invention, there is obtained not the usual partial reactions which occur on the electrode or felt surface, but a competing mechanism, in which the otherwise occcurring absorption of elemental sulfur from the felt surface, with the then subsequently necessary desorption of the sulfur, which constitutes the slowest step of the overall process, is omitted.

In the following, we shall first explain how the individual partial reactions during the recharging of an alkali metal-chalcogen cell are to be visualized. In the associated schematics, a section of a boundary surface (GF) of the felt (curved line) as well as of the melt (below the line) is shown. First, the partial reactions which occur with the customary, i.e., not modified felt, will be explained, refering to four schematics.

In stage I, to which the following schematic I belongs, the absorption of an $S_5^{2-}$ anion takes place on the surface of the felt.

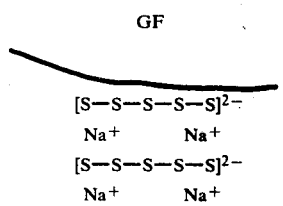

In stage II, two electrons are given off by the $S_5^{2-}$-ion to the graphite felt.

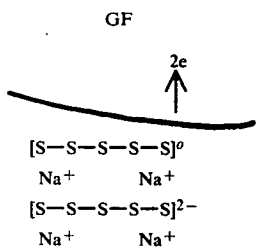

In stage III, the transport of two Na+ ions from the vicinity of the electrode toward the solid electrolyte takes place in order to restore the electron neutrality at the phase boundary.

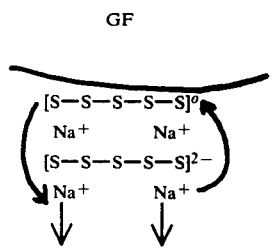

In stage IV, finally, the desorption of the $S_5$-chain has taken place. Because of its neutrality, this transport is not influenced by the electric field, which requires a relatively long occupancy of up to 5 adsorption locations of the graphite felt, especially since due to the known high adsorption heat of sulfur on graphite (of about 70 kcal/mol) a corresponding inhibition for desorption exists.

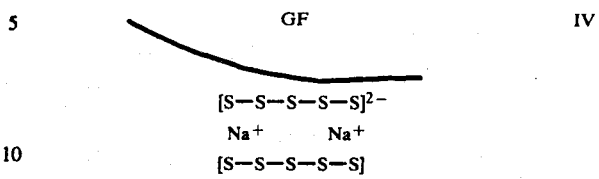

Now, the corresponding partial reactions in the case of a felt coated in accordance with the invention will be described, which can likewise be divided into four stages. In the related schematics, the felt surface is again represented as the curved upper line, and the alkali-ion-conducting layer is located in the center of the considered section adjoining the felt surface. The surface of the felt to the left and right of this layer is free. The size relations shown are not to scale. The following steps are assumed.

In stage I, a neutral $S_5$-chain and a charged anion $S_5^{2-}$ are adsorbed and separated by the Na+-ion conductor. For reasons of electron neutrality, the $S_5^{2-}$-chain is immediately surrounded by two Na+ ions. This is not the case with the neutral $S_5$-chain. The system described can, therefore, be considered as an Na+ ion concentration chain.

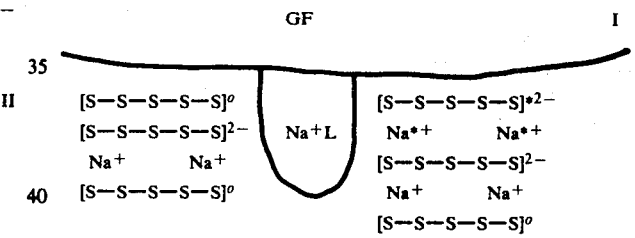

In stage II, therefore, an Na+ ion will travel through the layer from one carbon or graphite island to the next, and an electron of the $S_5^{2-}$-chain, via the graphite felt, to the neutral $S_5$-chain.

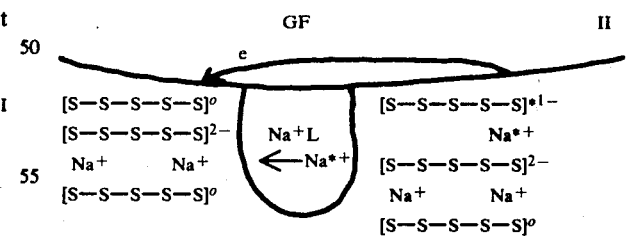

In stage III, the, for instance, left $S_5^{1-}$-anion can carry out an adsorption exchange with an adjacent $S_5^{2-}$-anion, where for reasons of electron neutrality an Na+ion must travel along to the surface. At the same time it can happen that the $S_5^{1-}$-ion on the right-hand side of the coating gives off one electron irrevocably to the felt. For reasons of electron neutrality, an Na+-ion must then travel away from the vicinity of the electrode.

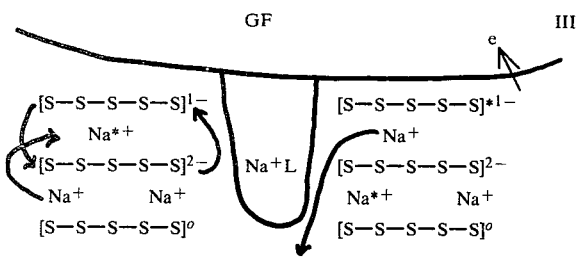

In stage IV, an $S_5^{2-}$-ion with two $Na^+$-ions and the produced neutral $S_5$-chain are again opposite each other. Before electrons are finally given off to the felt, a concentration equalization can again take place here, in which the $S_5^{1-}$-chain produced is adsorbed faster than a neutral $S_5$-chain, as will be explained in detail later on.

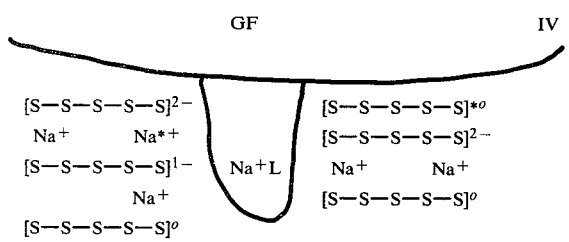

The invention will be supplemented in the following by theoretical explanations.

The starting point is the reasoning that desorption of charged sulfur chains might proceed substantially faster than that of uncharged sulfur chains.

The adsorption heat is a criterion for the dwelling time of the reactants at the felt surface. Under the conditions prevailing here, it can be assumed theoretically that a lowering of the adsorption energy by a few kcal/mol can bring about an increase of the desorption rate by a factor 10 and more. The following consideration shows that such a lowering can be expected for $S_5^{1-}$-ions instead of the normally present $S_5$-chains:

The adsorption energy, which is the activation energy for the desorption, can be calculated according to the following equation, if a covalent setup is made:

$$E_{ads} = (D_{C-C} + D_{S-S}) + 23.06(X_C - X_S)^2$$

where $D_{C-C}$ is the dissociation energy of a C—C bond,
$D_{S-S}$ is the dissociation energy of an S—S bond,
$X_C$ is the electronegativity value of carbon, and
$X_S$ is the electronegativity value of sulfur.

According to this setup, a value 71 kcal/mol is obtained for elemental sulfur, which is between the values for the C—S bond known from the literature of 55 kcal/mol and for the C—S bond of 103 kcal/mol.

If this equation is applied to the calculation of the adsorption energy of the $S_5^{2-}$-anion instead of the $S_5$-chain, the term $D_{S-S}$ must be replaced by the term $D''_{S-S}$. The latter represents the dissociation energy of the S-S bond in an $S_5^{2-}$-chain. Since in such a chain the following charge distribution is most probable;

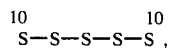

a splitting of the bond by the repulsion between the two electrons is preferred energywise and an adsorption energy for the $S_5^{2-}$-anion smaller by a factor of 1 to 2 orders of magnitude must come about and thereby, a faster desorption rate or higher current density i during the charging process according to the equation $$i = n_o \cdot z \cdot e_o \cdot e^{-E_{ads}/RT}.$$

In the equation above, $n_o$ = number of adsorption locations in 1 $cm^2$ area
$z$ = number of electrons given off during the adsorption time of a polysulfide anion,
$e_o$ = elementary charge
$E_{ads}$ = absorption heat of sulfur
R and T have the usual meaning.

It is assumed here, as already mentioned above, that the desorption rate of sulfur is the slowest step of the overall reaction.

It can further be assumed that the dissociation energy $D'_{S-S}$ of the S—S bond of an $S_5^{1-}$-chain will be between the energy levels $D_{S-S}$ and $D''_{S-S}$, so that not only for the $S_5^{2-}$-anion but also for the $S_5^{1-}$-anion, the desorption rate must still be substantially higher than that of elemental sulfur.

The consideration above shows that it is desirable to make the charging mechanism so that the faster-desorbing $S_5^{1-}$-anion is produced instead of elemental sulfur. In order to direct the partial reactions in this manner, it is necessary, however, according to the invention, to apply an alkali-ion-conducting layer. This measure, however, now decreases fundamentally the number of adsorptive locations for the electrochemical oxidation of the $S_5^{2-}$-anions. In addition, adsorption and desorption must take place twice at the same adsorption location in order to achieve giving off two electrons. Therefore, a counter argument will be presented to show whether this effect, which is due to the competing mechanism, could not overcompensate the acceleration presented above.

Here now, one must take into consideration that two changes are obtained according to the above-mentioned equation for the reaction rate or the current density. On the one hand, a reduction of the adsorption locations to one-half takes place with a typical coating due to the reduction of the exposed graphite areas by the coating, whereby the factor $n_o$ is reduced to about $\frac{1}{2}n_o$, and on the other hand, it must be considered that the number of the electrons given off is now likewise reduced to one-half, as already explained above. The factor $n_o \cdot z$ therefore becomes smaller by $\frac{1}{4}$ than in the normal case, i.e., the partial reactions occurring with the felt uncoated.

After the explanations on the effect of the adsorption energy lead one to expect a change of the overall reaction rate by 1 to 2 orders of magnitude, the reduction by the factor 4, which is now obtained by the counterargument, can therefore be tolerated.

Practical tests also have fully confirmed the result of these theoretical considerations, with felts coated in accordance with the invention versus uncoated felts.

In the following, the invention will be explained in greater detail with the aid of an embodiment example, from which further features and advantages of the invention can be seen.

In FIG. 1, a cross section through a cup-shaped test cell is shown. A beta-aluminum oxide tube 3 which is closed on one side and constitutes the solid electrolyte, is immersed in an electron-conducting cup-shaped collector 1. The cathode space 2 formed between the collector and the solid electrolyte is filled with sulfur and Na$_2$S$_x$ melt. The interior of the solid-electrolyte tube 3 is filled with liquid sodium 4. The upper part of the sodium space is closed off by the glass wall 5. The current from the sodium electrode is collected by a molybdenum wire 6. To avoid the loss of substance, a glass envelope designated by numeral 9 surrounds the sulfur electrode.

In accordance with the invention, the cathode space is now provided with a modified graphite felt. In the case of the example, the cathode space is not exclusively provided with coated felt, but with graphite felt rings 7, 8 as shown, of which one is alternatingly provided with a layer of an alkali-ion-conducting substance which is porous, i.e., leaves the surface of its fibers exposed in island-fashion, and the other is uncoated graphite.

The felt rings coated according to the invention were advantageously prepared as follows:

3.8 g beta-aluminum oxide powder with an average particle size of 40 μm were placed, with 1.7 g "Duranglas" from the firm Schott, Type D 50, of the following composition:

SiO$_2$—79.7 parts by weight, B$_2$O$_3$—10.3 parts by weight,
Al$_2$O$_3$—3.1 parts by weight, Na$_2$O—5.2 parts by weight,
CaO—0.8 parts by weight, MgO—0.9 parts by weight, also with an average particle size of 40 μm, in a solution of about 90 ml ethylester of acetic acid and 10 ml of a two-component adhesive, for instance, of the polyvinyl resin/nitrocellulose type and stirred for ½ hour. Then, 1.12 g of graphite felt in the form of 16 rings such as are suitable for a conventional cup cell, were immersed in the suspension. After ½ hour, these rings were completely impregnated with the suspension. They were subsequently pre-dried for 2 hours at 100° C., then heated to 1300° C. and cooled down again, the total heating and cooling process taking about 8 hours.

It was achieved by this thermal treatment that the glass was softened and the beta-aluminum oxide bodies were fused to the surface of the graphite felt.

Through the description above, it should have become clear that the preferably used intermediate layer between the graphite felt and the alkali-ion-conducting substance, for instance, beta-aluminum oxide, likewise does not form a homogeneous coherent layer; for, it was found from the theoretical considerations that exposed felt layers, i.e., electron-conducting layers, are necessary for the partial reactions to proceed. Generally, the coating is preferably carried out so that the degree of coverage of the felt is between 20 and 50%. The particle size of the powder, from which the ion-conducting layer and the intermediate layer, respectively, are prepared, can preferably be between 1 μm and 80 μm and the weight ratio of the sodium-ion-conducting powder and the intermedite layer to the felt-forming powder can vary between 1 and 5. As already said, the layers must not be visualized as closed uniform layers.

With a cell of the type described above, the relative charging capacity C/Co was now determined. C is the measured and Co is the respective theoretical charging capacity (the charging current densities were always 67 mA/cm$^2$). The curve designated by numeral 1 was taken for the case of a standard cell, i.e., a cell with an uncoated graphite felt in the cathode space. The curve shows a capacity of about 40% at 310° C.

Curve 3 comes from the cell with alternatingly uncoated and coated graphite felt rings shown in FIG. 1. The cells exhibited a capacity of 66% at 310° C., which reaches the value of 76% at 370° C.

Curve 2 shows the case of a coating with a material which is not sodium-ion-conducting material. Normal aluminum oxide (alpha-aluminum oxide) had been chosen as the coating. In accordance with the reduction of the free graphite felt surface due to the partial coating, the capacity at 300° C. is considerably lower. Interestingly, the curve shows a steep rise at higher temperatures, which are no longer preferred today; this could be explained by a change of the wetting of the elemental sulfur chains.

This juxtaposition makes clear the superiority of the cell with the felt coated according to the invention, especially at low operating temperatures.

There are claimed:

1. Electrochemical storage cell with at least one anode chamber containing alkali metal as the anolyte and at least one cathode chamber containing as catholyte at least one chalcogen in dissolved or melted form, as well as carbon- or graphite felt, with the anode chamber and the cathode chamber separated from each other by an alkali-ion-conducting solid electrolyte, the improvement which comprises incorporating in the felt a layer of porous felt in which the fibers of the layer of felt has exposed on its surface in island-fashion, an alkali-ion-conducting substance selected from the group consisting of beta-aluminum oxide, boron silicate glass and sodium-zirconium-phosphorus silicate having the formula Na$_{1-x}$Zr$_2$P$_{3-x}$Si$_x$O$_{12}$.

2. Electrochemical storage cell with at least one anode chamber containing alkali metal as the anolyte and at least one cathode chamber containing as catholyte at least one chalcogen in dissolved or melted form, as well as carbon- or graphite felt, with the anode chamber and the cathode chamber separated from each other by an alkali-ion-conducting solid electrolyte, the improvement which comprises incorporating in the felt a layer of porous felt in which the fibers of the layer of felt has exposed on its surface in island-fashion, an alkali-ion-conducting substance, wherein a glass layer is interposed between the alkali-ion-conducting substance and the fiber.

3. Storage cell according to claim 2, wherein the islands have a diameter of about 5 μm to 100 μm.

4. Storage cell according to claim 2, wherein the alkali-ion-conducting substance contains at least one member selected from the group consisting of beta-aluminum oxide, boron silicate glass and sodium-circonium-phosphorus silicate having the formula Na$_{1-x}$Zr$_2$P$_{3-x}$Si$_x$O$_{12}$.

5. Storage cell according to claim 2, wherein the substance consists of beta-aluminum oxide and the intermediate layer is a glass with the following composition:

SiO$_2$—79.7 parts by weight, B$_2$O$_3$—10.3 parts by weight, Al$_2$O$_3$—3.1 parts by weight, Na$_2$O—5.2 parts by weight, CaO—0.8 parts by weight, MgO—0.9 parts by weight.

6. Storage cell according to claim 2, wherein the chalcogen is a sulfur-containing substance.

7. Electrochemical storage cell with at least one anode chamber containing alkali metal as the anolyte and at least one cathode chamber containing as catholyte at least one chalcogen in dissolved or melted form, as well as carbon- or graphite felt, with the anode chamber and the cathode chamber separated from each other by an alkali-ion-conducting solid electrolyte, the improvement which comprises incorporating in the felt a layer of porous felt in which the fibers of the layer of felt has exposed on its surface in island-fashion an alkali-ion-conducting substance, wherein zones with coated and uncoated felt bodies alternate in the cathode space perpendicularly to said solid electrolyte.

8. Electrochemical storage cell with at least one anode chamber containing alkali metal as the anolyte and at least one cathode chamber containing as catholyte at least one chalcogen in dissolved or melted form, as well as carbon- or graphite felt, with the anode chamber and the cathode chamber separated from each other by an alkali-ion-conducting solid electrolyte, the improvement which comprises incorporating in the felt a layer of porous felt in which the fibers of the layer of felt has exposed on its surface in island-fashion an alkali-ion-conducting substance, wherein zones with coated and uncoated felt bodies alternate in the cathode space parallel to said solid electrolyte.

9. Electrochemical storage cell with at least one anode chamber containing alkali metal as the anolyte and at least one cathode chamber containing as catholyte at least one chalcogen in dissolved or melted form, as well as carbon- or graphite felt, with the anode chamber and the cathode chamber separated from each other by an alkali-ion-conducting solid electrolyte, the improvement which comprises incorporating in the felt a layer of porous felt in which the fibers of the layer of felt has exposed on its surface in island-fashion, an alkali-ion-conducting substance, wherein the alkali-ion-conducting substance is deposited into the felt from a suspension in liquid.

* * * * *